(12) United States Patent
Law

(10) Patent No.: US 9,795,009 B2
(45) Date of Patent: Oct. 17, 2017

(54) MULTI-MODE LIGHTING SYSTEM WITH PROXIMITY SENSOR

(71) Applicant: The Coleman Company, Inc., Wichita, KS (US)

(72) Inventor: Matthew G. Law, Wichita, KS (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 15/438,733

(22) Filed: Feb. 21, 2017

(65) Prior Publication Data

US 2017/0164451 A1 Jun. 8, 2017

Related U.S. Application Data

(62) Division of application No. 14/827,504, filed on Aug. 17, 2015, now Pat. No. 9,609,722.

(51) Int. Cl.
| | |
|---|---|
| *H05B 37/02* | (2006.01) |
| *H05B 33/08* | (2006.01) |
| *F21V 23/04* | (2006.01) |
| *F21L 4/02* | (2006.01) |
| *F21V 21/084* | (2006.01) |
| *F21V 21/14* | (2006.01) |

(52) U.S. Cl.
CPC ............ *H05B 37/0227* (2013.01); *F21L 4/02* (2013.01); *F21V 21/084* (2013.01); *F21V 21/145* (2013.01)

(58) Field of Classification Search
None
See application file for complete search history.

(56) References Cited

U.S. PATENT DOCUMENTS

| | | | |
|---|---|---|---|
| 6,966,668 B2 | 11/2005 | Cugini et al. | |
| 7,410,271 B1 | 8/2008 | Man | |
| 7,942,555 B2 | 5/2011 | Hadden | |
| 8,378,587 B2 | 2/2013 | Huguenin et al. | |
| 8,851,709 B2 | 10/2014 | Feinbloom et al. | |
| 2003/0067769 A1 | 4/2003 | Gilpin | |
| 2009/0180280 A1 | 7/2009 | Hadden | |
| 2012/0275140 A1* | 11/2012 | Feinbloom | F21L 14/00 362/105 |
| 2014/0070699 A1* | 3/2014 | Genthon | H05B 33/0845 315/82 |
| 2014/0070700 A1* | 3/2014 | Genthon | H05B 33/0854 315/83 |
| 2014/0198484 A1 | 7/2014 | Feustel et al. | |
| 2015/0003049 A1 | 1/2015 | Chang | |
| 2015/0115803 A1* | 4/2015 | Mackool | H05B 33/0803 315/152 |
| 2015/0305111 A1 | 10/2015 | Bortolotti et al. | |

* cited by examiner

*Primary Examiner* — Dedei K Hammond
(74) *Attorney, Agent, or Firm* — Husch Blackwell LLP

(57) ABSTRACT

Described herein is a lighting system capable of responding to user input provided via proximity sensors. In some embodiments, proximity sensors are communicatively coupled to a processor capable of receiving input from the sensors. The sensors may be arranged in a row such that an object moving down the row proximate to the sensors may trigger each sensor sequentially. In some embodiments, the lighting system may alter a beam configuration or cycle between various lighting modes in response to receiving input from the proximity sensors. In some embodiments, the order in which the sensor input is received may be used to determine which lighting mode to cycle to.

6 Claims, 10 Drawing Sheets

MULTI-MODE LIGHTING SYSTEM WITH PROXIMITY SENSOR

CROSS REFERENCE TO RELATED APPLICATION

This application is a divisional of and claims the benefit of and priority to U.S. application Ser. No. 14/827,504, filed Aug. 17, 2015, which is incorporated herein by reference in its entirety.

BACKGROUND

There are several situations in which a user may need to use a personal lighting system. In the past, flashlights have been extremely popular for use in these situations. However, recently users have begun to recognize the advantages of using a personal headlamp. For example, the use of a headlamp frees up a user's hands to allow the user to perform various tasks. However, the use of personal headlamps also presents problems that are not typically experienced by flashlight users. For example, when a user wearing the headlamp looks at a close object, light may be reflected into the eyes of that user. Additionally, having to manually switch a headlamp between modes can be problematic when the user's hands are dirty and/or slippery.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Some of the systems and techniques described herein include a lighting system capable of switching between lighting modes in response to user gestures or hand signals. In particular, the disclosure is directed to using a multitude of sensors to detect a direction of a hand movement, and changing modes of a lighting system based upon the detected direction of the hand movement. In accordance with at least some embodiments, the lighting system may cycle through lighting modes upon detecting a particular hand movement. Additionally, the disclosure discusses a lighting system capable of adjusting beam patterns automatically to reduce reflected light or glare. In particular, the lighting system may provide two or more light sources with different diffusion patterns. In some embodiments, reflected light from the two of more light sources may be detected and, in response to determining that the reflected light surpasses a threshold light level, one or more of the light sources may be extinguished.

Other features of the invention will become apparent from the following detailed description when taken in conjunction with the drawings, in which:

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
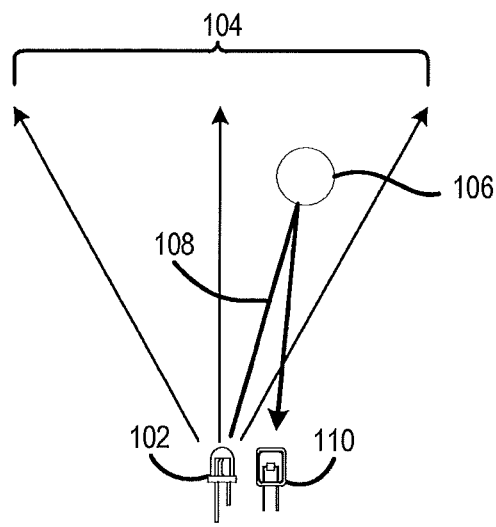
FIG. 1 depicts an illustrative example lighting system in which a proximate object may be detected.

Some embodiments described herein are directed to a portable lighting device in which movement of and/or reflection from a proximate object may be detected, and a mode of the portable lighting device can be changed based upon the movement of the detected object. For example, FIG. 1 depicts a portable lighting device 102 from which electromagnetic radiation 104 is being emitted. Also depicted in FIG. 1 is an object 106 in proximity to the portable lighting device 102 and in the path of the electromagnetic radiation 104. In this example, reflected electromagnetic radiation 108 may be detected by one or more sensors 110 located on the lighting device 102.

In accordance with at least some embodiments, the one or more sensors 110 are each any structure that can detect reflected electromagnetic radiation 108. As examples, the sensor 110 may be a photosensor, such as a photosensitive diode, a bipolar phototransistor, or a photosensitive field-effect transistor. In some embodiments, the amount of light detected by the sensor may be compared to a threshold value to ensure that the portable lighting device 102 responds only to a threshold amount of reflected light.

In accordance with at least some embodiments, the one or more sensors are one or more infrared proximity sensors. The reflected electromagnetic radiation 108 detected by the infrared proximity sensors is infrared light. In this example, the electromagnetic radiation 104 may be infrared light emitted from one or more infrared emitters (e.g., an infrared LED). The infrared light may be reflected by the object 106 onto a first infrared sensor. As the object 106 moves, the infrared light may be reflected onto one or more additional infrared sensors. In some embodiments, a microprocessor may determine the direction of the object's movement based on the order that the one or more infrared sensors are triggered.

Figure 2:
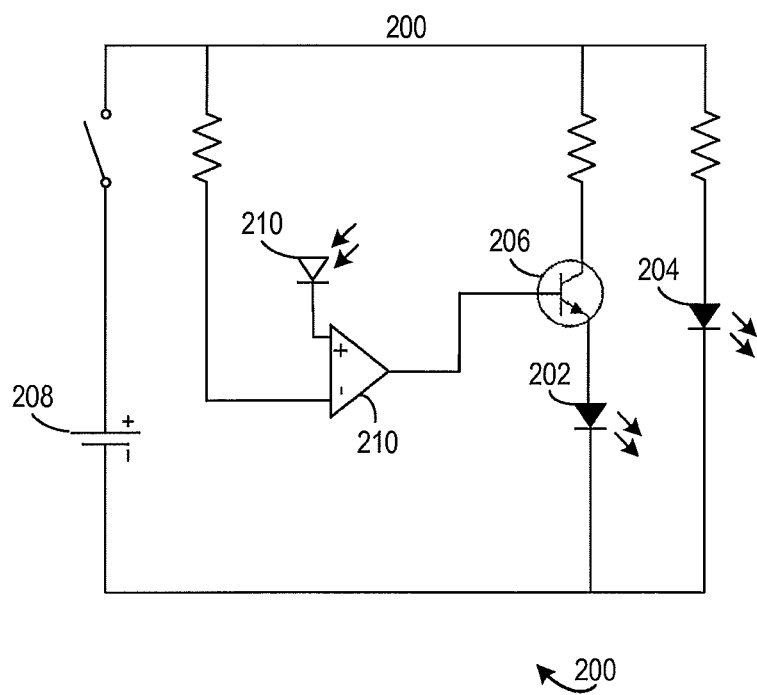
FIG. 2 depicts an example circuit diagram for a lighting system, such as the lighting system in FIG. 1, which enables a subset of light sources to be extinguished in response to detecting a light emission.

FIG. 2 depicts an example circuit 200 which enables a subset of light sources to be extinguished in response to detecting a light emission. It should be noted that this is only one illustrative example circuit, and one skilled in the art would recognize several alternative implementations using various electronic components. In FIG. 2, one or more light sources 202 and 204 may be included in the circuit 200. In some embodiments, a light source 202 may be placed in series with a transistor 206 or other electronic component capable of connecting or disconnecting light source 202 from a power source, such as a battery 208. In some embodiments, a photosensitive diode 210 may be used to detect incoming or reflected light.

In accordance with at least some embodiments, it may be beneficial to determine that the light detected is greater than a threshold amount. This may be done to ensure that the circuit 200 responds to a sufficient light level and is not responding to "noise," such as that produced when photosensitive diode 210 is in photoconductive, or reverse biased, mode. The photosensitive diode 210 may be wired in series with a comparator 404 that compares the received input voltage from the photosensitive diode 210 to a fixed reference voltage. In some embodiments, a photosensitive diode 210 may be utilized in photovoltaic mode (in zero bias) such that the flow of current is restricted and a voltage is built up. In these embodiments, a current may be produced once a voltage threshold is reached. In some embodiments, the photosensitive diode 210 may be combined in series with a not gate, or an inverter circuit.

By way of illustrative example, circuit 200 may be implemented in a lighting device. light source 202 may be a "spot" (narrowly focused) light source and light source 204 may be a "flood" (broadly focused) light source. Upon detecting incoming light, photosensitive diode 210 may produce an output voltage which may then be compared to a reference voltage. The output voltage produced by the photosensitive diode 210 may be inverted such that transistor 206 is active when the output is below the reference voltage. In this example, the spot light source 202 may be turned off when a sufficient level of light is detected by the photosensitive diode 210.

Figure 3:
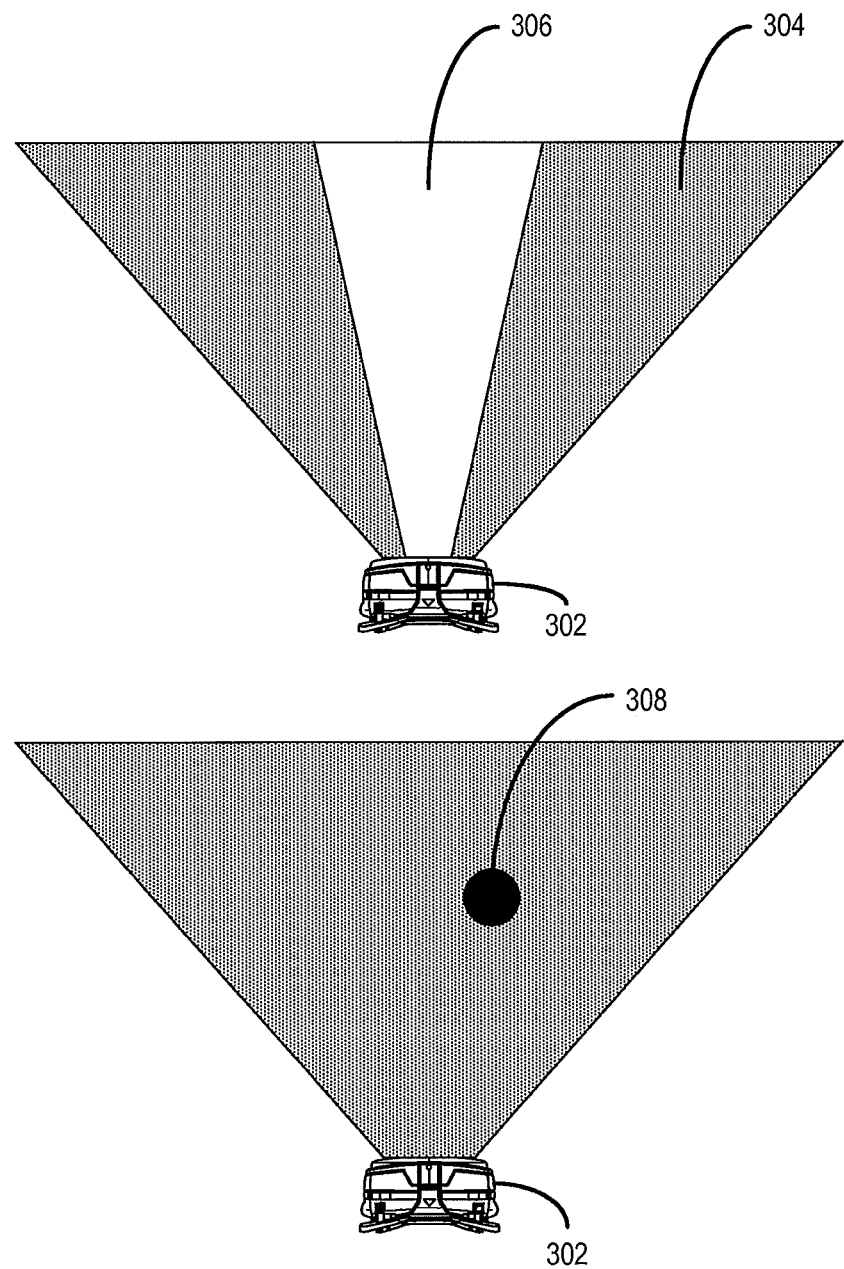
FIG. 3 depicts an illustrative embodiment of a lighting system in which a beam configuration is altered automatically.

FIG. 3 depicts an illustrative embodiment of a lighting system in which a beam configuration is altered automatically. The lighting system may also be configured to change its beam configuration in order to reduce reflected light. For example, the lighting system may include multiple light sources active at a single time. Some of these light sources may have different patterns of diffusion. For example, a "flood" or broad beam may provide less light to a wider area. A "spot" or narrow beam may provide a more intense light to a focused area. In at least some embodiments, the lighting system may be configured to turn on/off one or more light sources under specific conditions. For example, consider a lighting system that includes both a flood light source and a spot light source active at the same time. The lighting system may include a photovoltaic diode capable of detecting reflected or incoming light. If the photovoltaic diode detects a sufficient amount of incoming light, then the lighting system may be configured to extinguish the spot light source, leaving only the flood light source active.

In FIG. 3, a lighting device 302 is depicted as having multiple light sources with varying beam patterns. For example, a lighting device may comprise light sources that create a wide beam 304 and a narrow beam 306. In FIG. 3, when an object 308 is placed within the path of one or more of the beams, light may be reflected back toward the lighting device. In some embodiments, once a threshold light level is detected at the lighting device, one or more of the light sources may be extinguished, changing the configuration of the light beams. In the currently illustrated example, when object 308 is placed proximate to lighting device 302, the light source providing the narrow beam 306 is extinguished.

Figure 4:
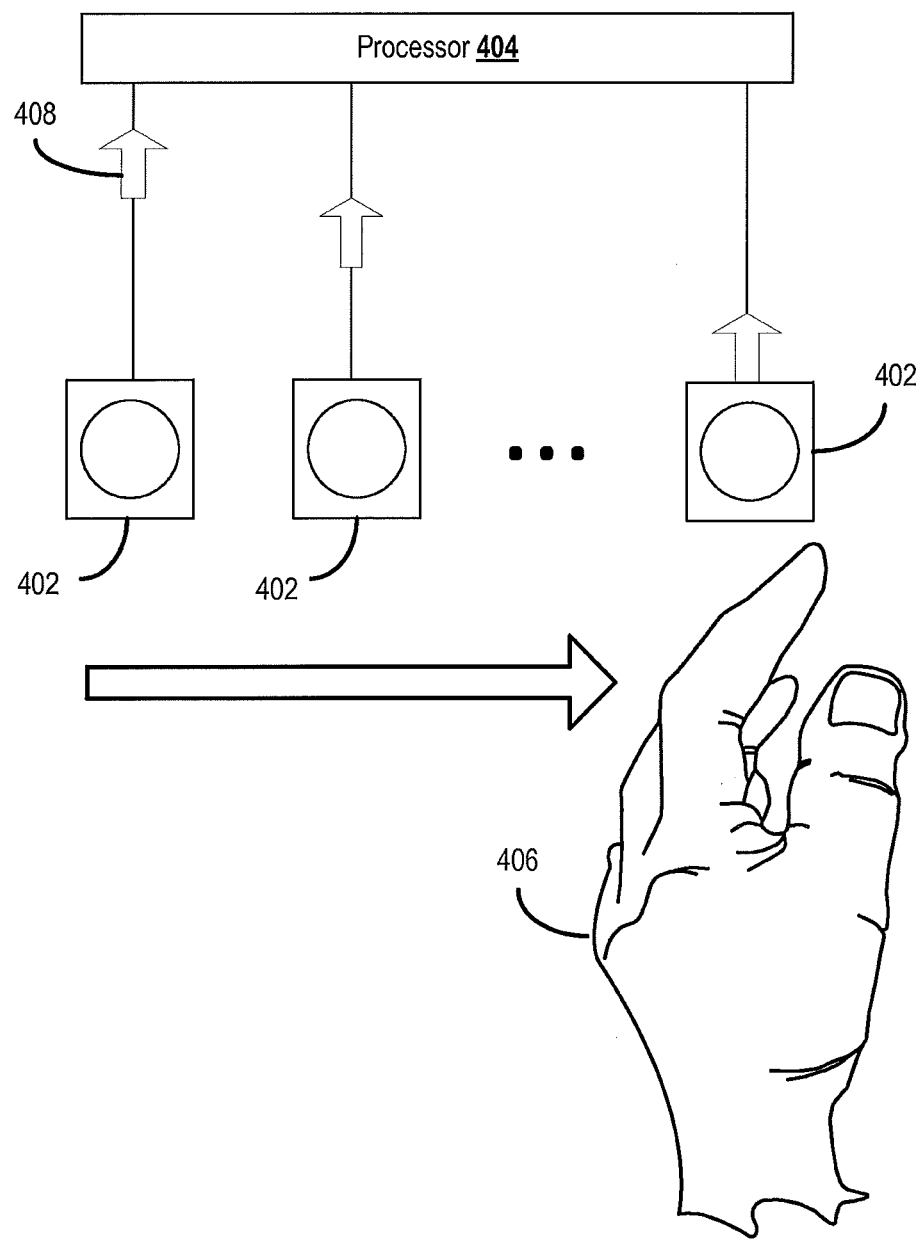
FIG. 4 depicts an illustrative example of an input detection technique for a lighting system, the input detection technique using proximity sensors.

FIG. 4 depicts an illustrative example of an input detection technique using proximity sensors. In FIG. 4, multiple proximity sensors 402 may be aligned in one or more rows. The proximity sensors 402 may be infrared proximity sensors or any other sensor capable of detecting a proximate object. In accordance with at least some embodiments, the sensors 402 may be arranged in an array, or multiple rows. In accordance with at least some embodiments, the multiple proximity sensors 402 may comprise two sensors 402 spaced apart vertically or horizontally.

Each of proximity sensors 402 may be connected to one or more processor(s) 404 capable of processing sensor input. As an object 406 triggers one or more proximity sensors 402, a signal 408 is received by the processor 404. Based on the order in which signals 408 are received by the processor 404, the processor 404 may determine a direction of movement for the object 406. The processor 404 may be further connected to one or more light sources and may control one or more lighting modes of the light sources.

In some embodiments, one or more proximity sensors 402 may take the place of the photosensitive diode of FIG. 2. For example, an infrared proximity sensor may be used to detect a proximate object. In this example, a beam configuration of the lighting system may be altered automatically upon determining that the object has been detected by the infrared proximity sensor. In accordance with at least some embodiments, a single infrared light source may be used in conjunction with multiple infrared proximity sensors. For example, a centralized infrared LED may be used to emit infrared light that may then be detected by one or more of the infrared proximity sensors as it is reflected off of an object 406.

In accordance with at least some embodiments of the disclosure, the personal lighting system may include multiple sensor devices and one or more microprocessors. In some embodiments, the sensors may be situated in a row, such that a movement of a close object along the row will trigger each sensor sequentially and enable a microprocessor to determine the direction of the object's movement. The sensors may be additionally or alternatively arranged in an array, or multiple rows, such that an object's movement may be detected in multiple directions. In at least some embodiments, the system may include only two sensors such that if the two sensors are each triggered sequentially, the microprocessor can determine the direction of an object's travel.

In accordance with at least some embodiments of the disclosure, the lighting system may have one or more lighting modes. For example, the lighting system may adjust the brightness of its light source, change the color of the emitted light, provide a "strobe" function, or provide any other suitable lighting mode. In accordance with at least some embodiments, the lighting system may switch modes in response to receiving input from the microprocessor. In some embodiments, the lighting system, upon receiving an indication to change modes, may cycle through various modes. For example, after a first indication, the lighting system may change the color of the emitted light. After a second indication, the lighting system may activate the strobe function. After a third indication, the lighting system may return to its regular light emission style. As an example of another mode change, the brightness of the light source may be adjusted in a number of ways. For example, the lighting system may adjust the power provided to the light source, the pulse frequency of the light source, or it may turn on/off one or more light sources in a plurality of light sources.

By way of illustrative example, a user utilizing the lighting system may wave his finger or hand in front of the lighting system. In this example, the lighting system may have two infrared sensors capable of detecting the user's hand wave at two separate points. A microprocessor may receive the signals from each of the two sensors and determine the direction of the wave based on the order in which the signals are received. In this example, if the user waves his hand from left to right, the lighting system may cycle through brightness levels. If the user waves his hand from right to left, the lighting system may cycle through various lighting modes. In this way, it is envisioned that each function of the multi-functional lighting system may be activated without touching the lighting system.

Figure 5:
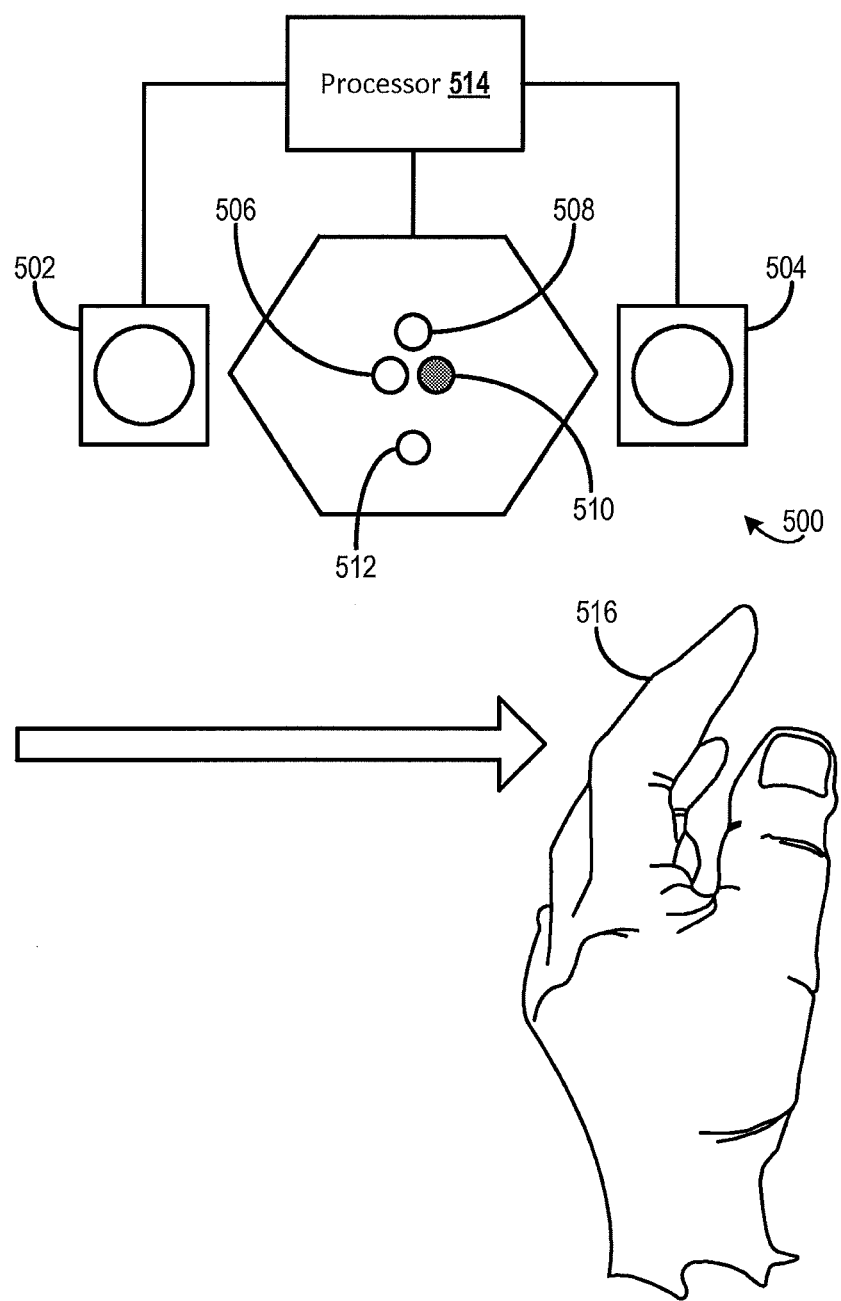
FIG. 5 depicts an illustrative example of a lighting system that responds to user input detected via two proximity sensors.

FIG. 5 depicts an illustrative example of a lighting system 500 that responds to user input detected via two proximity sensors. In lighting system 500, two proximity sensors (502 and 504) may be located some distance apart. In the currently depicted example, one or more light sources (506, 508, and 510) as well as one or more sensors (such as photosensitive diode 512) may be located in between the two proximity sensors 502 and 504. In at least some embodiments, one of light sources 506, 508, and 510 may be an infrared emitting light source capable of being utilized by infrared proximity sensors.

In accordance with at least some embodiments, the lighting system 500 may include one or more processors 514 capable of receiving input from the proximity sensors 502 and 504. In accordance with at least some embodiments of the disclosure, the lighting system 500 may have one or more lighting modes. For example, the lighting system 500 may be configured to provide a high, medium, and/or low intensity output mode. Additionally, the lighting system may be configured to provide alternative color modes, a strobe mode, a spot mode (e.g., having a narrowly focused beam), a flood mode (e.g., having a broad beam) or any other suitable lighting mode. To produce the various lighting modes, the lighting system may have multiple types of light sources. For example, the lighting system may have a flood light source 506, a spot light source 508, and/or one or more alternative color light sources 510. In accordance with at least some embodiments, the lighting system may be configured to switch lighting modes in response to receiving input from the processor 514. In some embodiments, the processor 514 may be configured to cycle between various lighting modes upon detecting input from the sensors 502 and/or 504.

In accordance with at least some embodiments, the lighting system 500 may be configured to respond to an object 516 placed close to the sensors. In some embodiments, the processor 514 may be configured to switch to a specific mode upon receiving input from sensor 502 and/or sensor 504. For example, covering one sensor or the other may cause light sources on one side of the lighting system 500 or the other to be extinguished. In some embodiments, covering both sensors at the same time may cause the light sources to be put in low intensity mode. For example, a user may cover the lighting system 500 with his or her hand and, in response, the processor may be configured to dim the light sources. As described elsewhere in this specification, the lighting system's beam configuration may be altered automatically in response to detecting an object 516 placed in proximity to the lighting device. For example, when the object 516 is detected in proximity to the lighting system, a light source providing a spot beam may be extinguished.

The processor may also be configured to respond to the movement of an object 516 in a particular direction. For example, if the sensors 502 and 504 are each triggered sequentially, the processor may be configured to provide a different output based on the order in which the sensors 502 and 504 are triggered. In some embodiments, the processor may be configured to cycle through lighting modes in a particular order based on the direction of the object's travel. In some embodiments, the processor may be configured to cycle between different sets of lighting modes based on the object's direction of travel. For example, the object moving left to right may result in cycling between strobe mode, red light mode, and normal mode. In this example, the object moving right to left may result in cycling between low intensity mode, medium intensity mode, and high intensity mode. In some embodiments, the processor may also respond to the timing of sensor triggering. For example, a shorter elapsed time between a signal from a first sensor and a signal from a second sensor may indicate a quicker movement of the object. In this example, the processor may be configured to cycle straight to a particular mode. By way of illustration, if the processor detects a quick movement of an object from left to right, then it may be configured to cycle straight to a high intensity mode.

Figure 6:
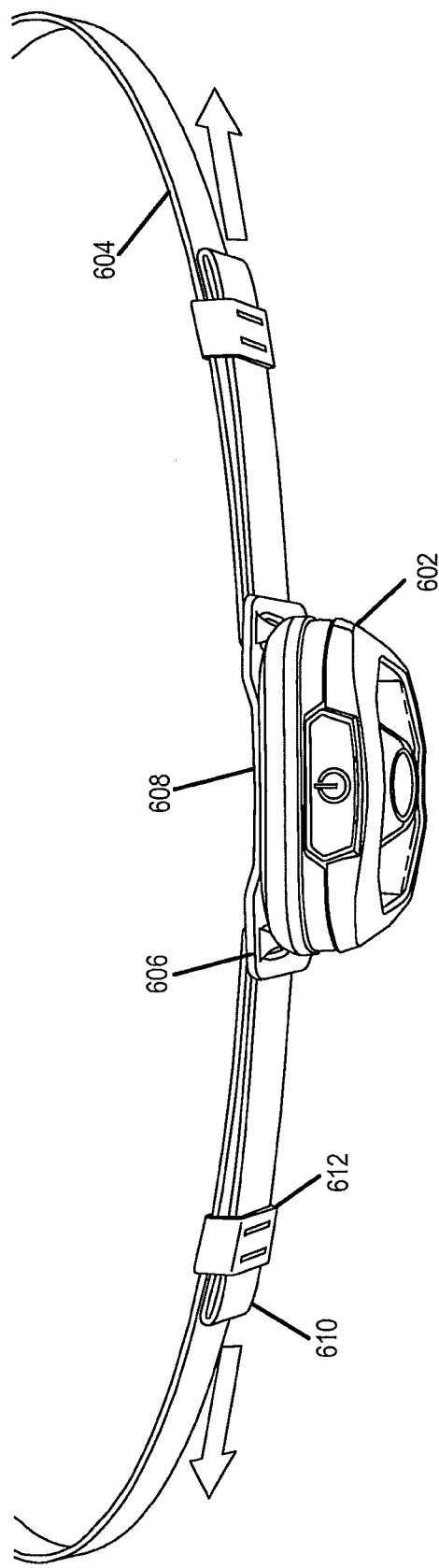
FIG. 6 depicts an illustrative example headband for securely and comfortably attaching a lighting system to a user.

In accordance with at least some embodiments of the disclosure, the lighting system may include an attachment means (e.g., a strap, band, clip, or any other suitable means for attaching the lighting system to a person or object). In some embodiments, the lighting system may include an elastic band with a pull tab, a pull tab guide, and a molded in tension lock. FIG. 6 depicts an illustrative example means for securely and comfortably attaching a lighting system to a user. In FIG. 6, a lighting system 602 is depicted as connected to an elastic strap 604. Strap 604 may comprise a band of plastic, rubber, fabric, or any other suitable elastic material. Strap 604 may be wound through one or more tension locks 606 in order to secure the strap 604 to the lighting system 602. In some embodiments, the lighting system 602 may be fitted with a back plate 608 made of a flexible material (e.g., rubber, or plastic having a lower durometer) that is capable of contouring to an object or person.

In accordance with at least some embodiments, the strap 604 may include a pull tab 610 that may be used to adjust the tightness of the strap 604. Additionally, one or more pull tab guides 612 may be provided to keep the pull tab 610 aligned with the strap 604. Pull tab guides 612 may consist of hard material (e.g., mid to high durometer plastic).

Figure 7:
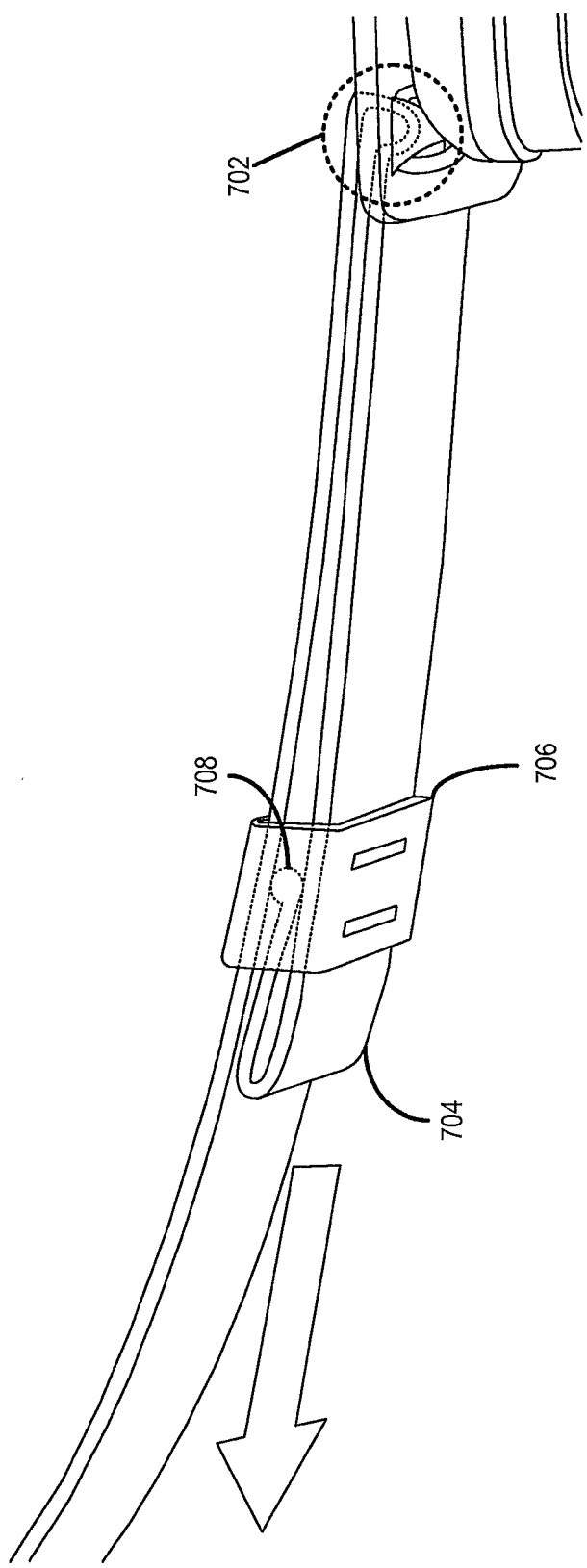
FIG. 7 depicts a detailed view of a portion of the headband of FIG. 6, showing a strap, a molded-in tension lock, a pull tab, and a pull tab guide.

FIG. 7 depicts a blow-up diagram of a portion of a strap, a tension lock 702, a pull tab 704, and a pull tab guide 706. Tension lock 702 may be any means of creating friction or tension in the strap, such as a ladderlock, buckle, or any other suitable tensioning means. In some embodiments, tension lock 702 may be molded into, or attached to, a lighting system such that the strap forms a connection with the lighting system. In some embodiments, pull tab 704 may include a spacer 708 capable of exerting outward pressure upon the pull tab guide 706. This may prevent the pull tab 704 from being pulled through the pull tab guide 706 and may also provide friction to prevent unwanted movement of the pull tab 704 or pull tab guide 706. In the currently depicted illustration, pulling on the pull tab 704 in the direction of the arrow may result in a tightening of the strap.

Figure 8:
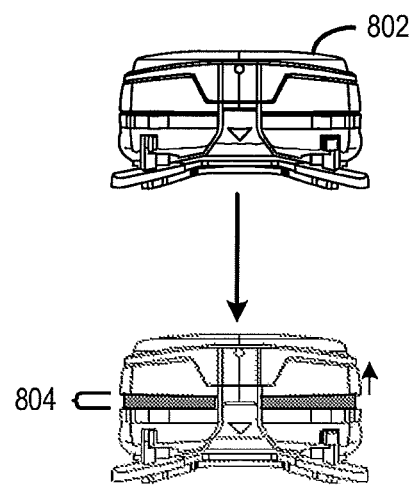
FIG. 8 depicts a battery disconnection feature that may be implemented in some embodiments of lighting systems.

FIG. 8 depicts a battery disconnection feature that may be implemented in some embodiments of the lighting system. In accordance with at least some embodiments, a lighting system 802 is depicted as including a front section that is capable of sliding forward. In this example embodiment, a gap 804 created by sliding the front plate forward may be configured to sever a connection between the battery and the light source, preventing the battery from continuing to be drained over time. In this example embodiment, the front plate may slide back into place to complete the connection between the battery and the light source.

Figure 9:
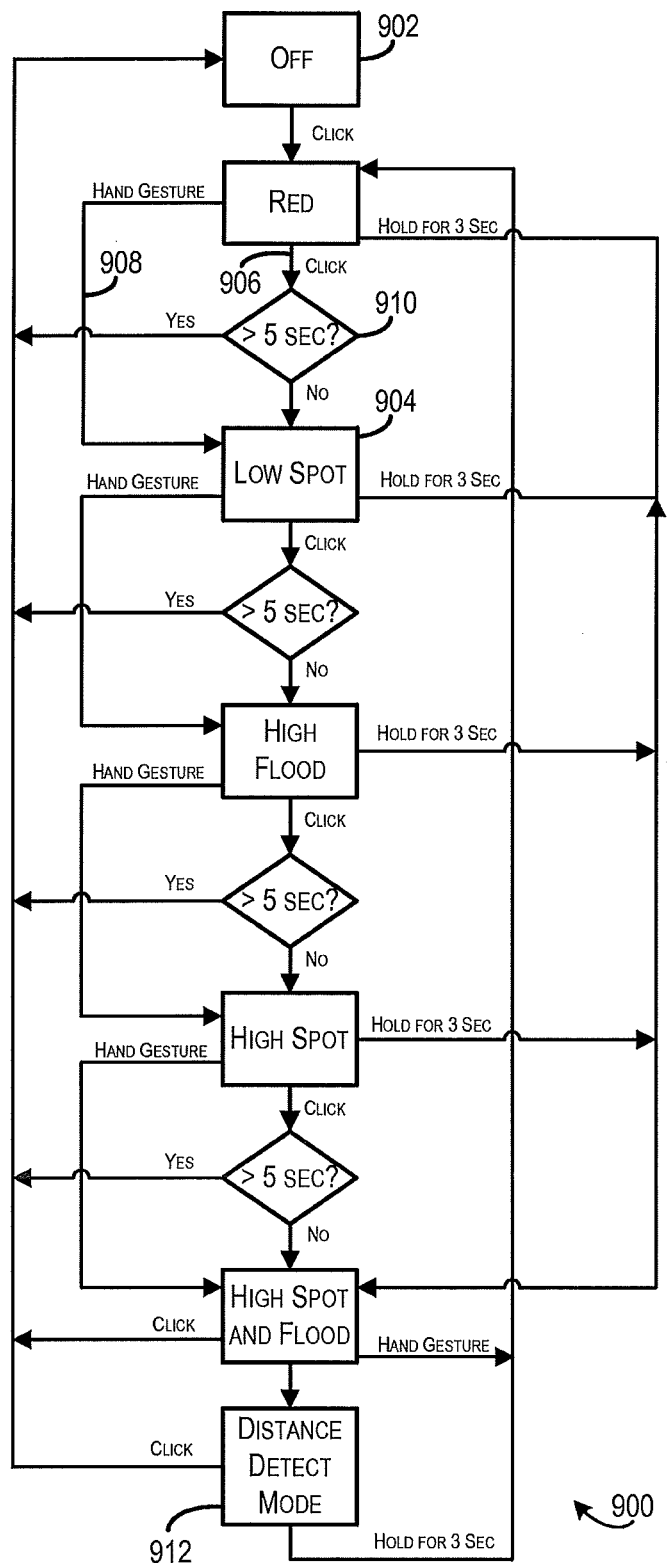
FIG. 9 depicts an illustrative flow diagram depicting an example technique for cycling through lighting modes in accordance with at least some embodiments.

FIG. 9 depicts an illustrative flow diagram 900 depicting an example technique for cycling through lighting modes in accordance with at least some embodiments. In FIG. 9, a portable lighting device may start in an Off mode (i.e., an unpowered state). The user may be required to click (or suppress) a button in order to power on the portable lighting device. Once powered-on, a microprocessor included in the portable lighting device may be configured to cycle through various lighting modes 904 in response to detecting one or more user interactions. The portable lighting device may be provided with one or more buttons used to provide user input. In some embodiments, the portable lighting device may include a single button that may be used to provide multiple user inputs based on the length of time that the button is suppressed. For example, if the microprocessor detects that the button is pushed and immediately released, then it may be configured to cycle to the next lighting mode. The microprocessor may also be configured to cycle to the next lighting mode 904 upon detecting that a hand gesture has been performed 908. In some embodiments, the user may be able to suppress a button for a length of time. For example, if the microprocessor determines that the button has been suppressed for more than 5 seconds, then the microprocessor may be configured to turn the portable lighting device off. Additionally, the microprocessor may be configured to skip lighting modes upon detecting particular conditions. For example, upon determining that the button has been suppressed for a period of time less than 5 seconds, but greater than or equal to 3 seconds, the microprocessor may be configured to skip the next lighting mode in the cycle and go straight to a particular mode 912.

Figure 10:
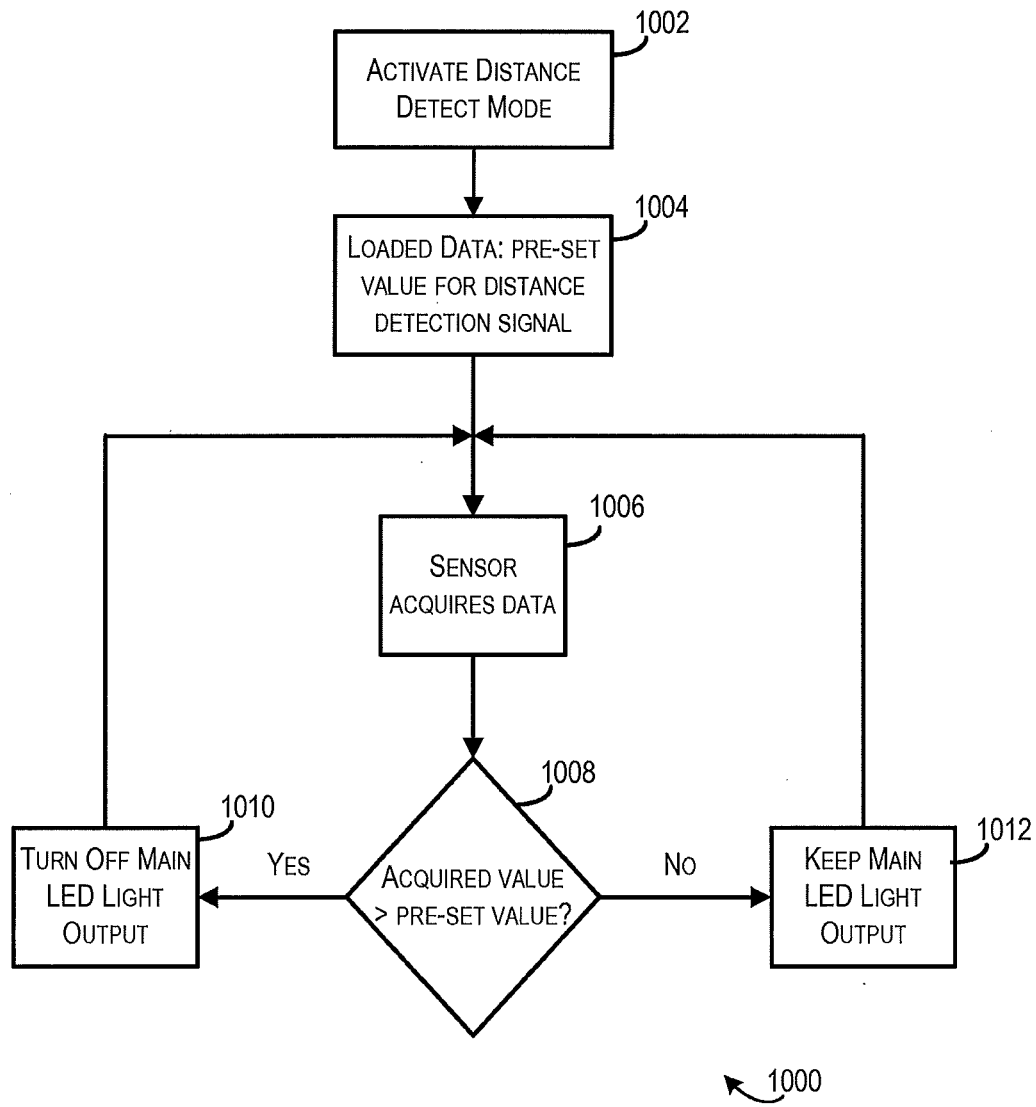
FIG. 10 depicts an illustrative flow diagram depicting an example distance detection mode in accordance with at least some embodiments.

FIG. 10 depicts an illustrative flow diagram 1000 depicting an example distance detection mode in accordance with at least some embodiments. A portable lighting device may include a distance detection mode that may be activated at 1002 by powering the portable lighting device on or by cycling to the lighting mode using the technique illustrated in FIG. 9. In some embodiments, the portable lighting device may be pre-loaded with a pre-set value (e.g., a light threshold). This threshold may be pre-set programmatically (e.g., by storing the threshold value in memory) or it may be pre-set electronically (e.g., by using one or more comparator circuits as described in FIG. 2).

Upon acquiring a light input by the sensor at 1006, the portable lighting device may compare the acquired signal to the pre-set value at 1008. For example, the portable lighting device may use a microprocessor to determine whether the acquired signal is greater than the stored pre-set threshold value. In another example, the portable lighting device may include a photosensitive diode in circuit with a comparator. In this example, a second input may be provided to the comparator to act as a threshold value. If the acquired value is determined to be greater than the threshold value, then one or more light sources may be extinguished at 1010. Otherwise, the light sources may be kept on at 1012 (or turned back on). It is envisioned that this process may continue indefinitely until the portable lighting device is powered off or the lighting mode is changed.

Described in the current disclosure is a lighting system assembly configured to provide an adjustable light source for a user. One skilled in the art would recognize that a number of lighting systems may utilize the techniques described. It should be noted that lighting systems including the described techniques are equivalent to the those described in the current disclosure. For example, the provided system and techniques may be implemented as a flashlight, a personal headlamp, a lantern, or any other suitable lighting system. However, aspects and features described herein are particularly suitable for portable lighting systems, such as flashlights or headlamps. Such portable lighting systems include an integrated power source, such as one or more batteries, so that the lighting system can be utilized by an individual for illumination during nighttime or low light tasks or activities. The lighting system may include, inter alia, multiple light-emitting diodes (LEDs), one or more light detection sensors (e.g., a photovoltaic diode), proximity sensors, and/or a microprocessor.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A lighting apparatus comprising:
    a housing configured to encompass:
        one or more batteries;
        one or more sets of light sources positioned generally facing a first direction, including at least:
            a first light source configured to produce a first beam configuration; and
            a second light source configured to produce a second beam configuration different from the first beam configuration; and
        one or more sensors positioned facing the first direction, said one or more sensors configured to detect incoming light from at least one of the first and second beam configurations reflected back toward the one or more sensors from an object;
        an electronic circuit connected to the first and second light sources and the sensor and configured to extinguish one of the first light source or the second light source while maintaining illumination of the other so long as, and in response to receiving an indication that, incoming light from at least one of the first and second beam configurations reflected back toward the one or more sensors from said object has been detected by the one or more sensors.

2. The lighting apparatus of claim 1, wherein the one or more sensors comprises a photosensitive diode.

3. The lighting apparatus of claim 2, wherein the first light source or the second light source is extinguished in response to the photosensitive diode detecting an amount of light above a threshold light level.

4. The lighting apparatus of claim 1, wherein the first light source is configured to produce a narrow beam in the first direction and the second light source is configured to produce a broad beam in the first direction.

5. The lighting apparatus of claim 1, wherein the lighting apparatus is a personal headlamp device.

6. The lighting apparatus of claim 1, wherein the electronic circuit is further configured to turn the extinguished light source back on in response to no longer receiving the indication that incoming light has been detected by the one or more sensors.

* * * * *